United States Patent [19]

Mills

[11] Patent Number: 5,252,164
[45] Date of Patent: Oct. 12, 1993

[54] METHOD FOR MAKING A SUPPLEMENTAL IMPACT RESTRAINT DOOR AND INSTRUMENT PANEL SYSTEM FROM SINGLE, UNITARY COVER

[75] Inventor: Daniel H. Mills, Durham, N.H.

[73] Assignee: Davidson Textron Inc., Dover, N.H.

[21] Appl. No.: 993,675

[22] Filed: Dec. 21, 1992

[51] Int. Cl.⁵ ............................................. B29C 43/18
[52] U.S. Cl. .................................. 156/212; 156/242; 156/253; 156/267; 156/285; 280/728
[58] Field of Search ............... 156/196, 212, 242, 245, 156/253, 267, 285, 297, 311; 280/728 B, 728 R, 732

[56] References Cited

U.S. PATENT DOCUMENTS

| | | | |
|---|---|---|---|
| 3,801,126 | 4/1974 | Knight, IV et al. | 280/150 |
| 4,574,025 | 3/1986 | Juaire et al. | 156/245 |
| 4,952,351 | 8/1990 | Parker et al. | 264/46.4 |
| 5,096,221 | 3/1992 | Combs et al. | 280/732 |

Primary Examiner—Michael W. Ball
Assistant Examiner—Richard Crispino
Attorney, Agent, or Firm—Reising, Ethington, Barnard, Perry & Milton

[57] ABSTRACT

An SIR door and instrument panel are formed by adhering a single, unitary cover material over a preformed door insert member and separate preformed panel insert member. The insert members are sprayed with an adhesive and placed on a support member with the door insert member aligned with and raised above an opening in the panel insert member. The single, unitary cover material is laid over the insert members and vacuum formed thereabout. Thereafter, the cover material is trimmed from the door insert member. The door insert member and cover material are removed from support member. The instrument panel and supplemental impact restraint (SIR) door may thereafter be assembled.

6 Claims, 2 Drawing Sheets

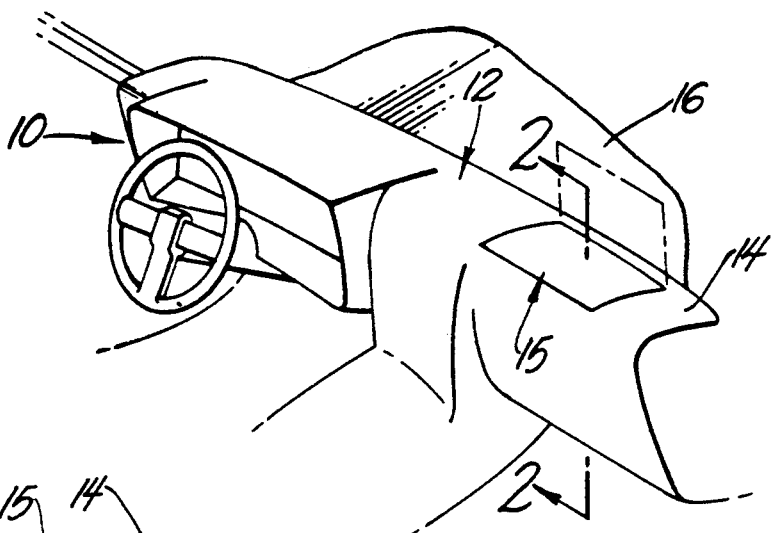
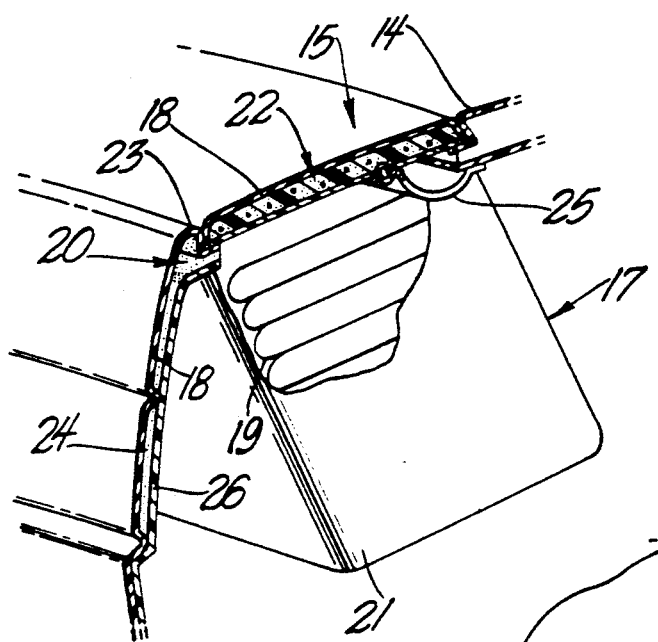
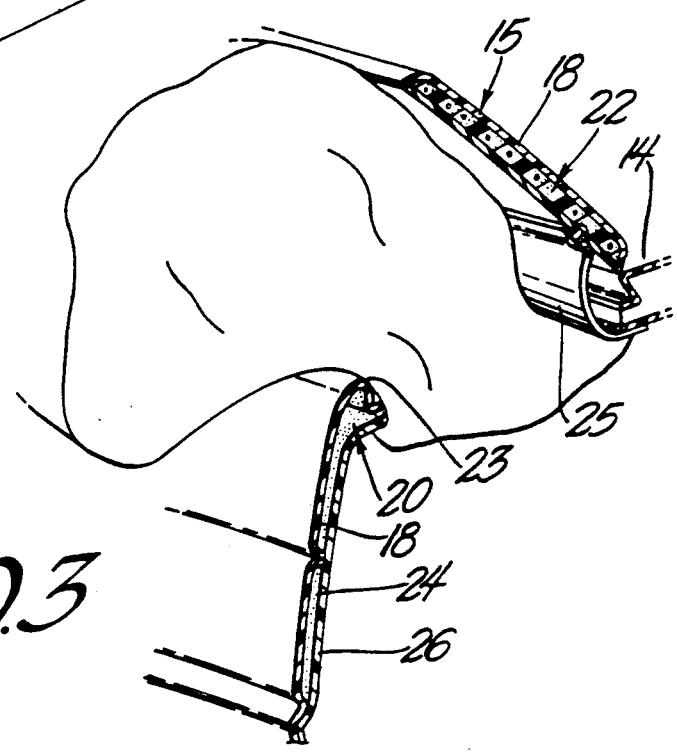
Fig. 1
Fig. 2
Fig. 3

METHOD FOR MAKING A SUPPLEMENTAL IMPACT RESTRAINT DOOR AND INSTRUMENT PANEL SYSTEM FROM SINGLE, UNITARY COVER

TECHNICAL FIELD

The invention relates to a method of making covers for safety air cushion devices, and more particularly to a method for forming a door and an instrument panel with grain and color matched cover material thereover, which door is openable to provide for deployment of an air cushion from the instrument panel assembly.

BACKGROUND OF THE INVENTION

Various methods have been proposed to form a cover over a deployable air cushion restraint located within the confines of an automotive interior part such as an instrument panel. One such method is set forth in U.S. Pat. No. 3,801,126 and discloses an instrument panel in which an air cushion device is stored behind a cover or door which fits within an instrument panel opening. The instrument panel and the cover are separately fabricated and are assembled following molding of the component parts of the instrument panel.

U.S. Pat. No. 4,952,351, assigned to the assignee of the subject invention, discloses a method form integrally molding a pre-assembled door within an instrument panel to provide a cover for a safety air cushion device. The plastic instrument panel is molded about and over the door in situ of a mold cavity, and a portion of the instrument panel is removed which overlies the door to provide an opening therein to expose the door for opening movement with respect to the instrument panel upon deployment of the air cushion device.

However, these methods require the use of multiple operations to produce the combination of the instrument panel and the air bag door, and furthermore it is difficult to match color and grain of the cover material.

SUMMARY OF THE INVENTION

The invention is a method of molding a cover material over a preformed door insert and a plastic panel insert of an interior trim product for an automobile. The method includes the steps of applying an adhesive over the panel insert and the door insert, placing the panel insert on a support, placing the door insert within an opening of the panel insert on a support tower of the support, placing a unitary cover material over the panel insert and the door insert, and forming the cover material about the door insert and continuously over the panel insert. The method also includes cutting the covered door away from the covered panel insert and removing the covered door from the support and thereafter removing the covered panel insert from the support.

By forming a unitary cover material over both the door and panel inserts, both grain and color are consistent in the covering material for the two inserts. Furthermore, waste of the cover material is decreased by forming the cover over the panel insert with the door insert located within the door insert opening of the panel insert member. In prior methods, the outer covering material covered such door insert opening and constituted waste material when cut away to form the door insert opening.

BRIEF DESCRIPTION OF THE DRAWINGS

The advantages of the invention will become more readily apparent when taken in conjunction with the accompanying drawings wherein:

FIG. 1 is a perspective view of an instrument panel including the door construction of the present invention;

FIG. 2 is an enlarged perspective view, partially sectioned showing the instrument panel and door combination of the present invention along lines 2—2 of FIG. 1 looking in the direction of the arrows;

FIG. 3 is an enlarged perspective view, partially sectioned showing the instrument panel and door combination of the present invention of FIG. 2 in a partially deployed position.

DESCRIPTION OF THE PREFERRED EMBODIMENT

Figure 4A:
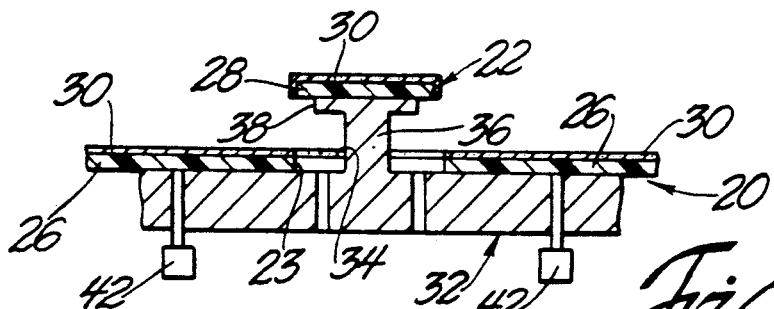
FIGS. 4a-d are schematic views of the method used to fabricate the constructions shown in FIGS. 1-3.

A vehicle compartment 10 is shown having an interior trim component representatively shown as an instrument panel 12 in FIGS. 1 and 2. For purposes of discussion, the invention will be incorporated in the illustrated instrument panel 12 with it being understood that both the method and product formed by the method of the present invention are equally suitable for use with other vehicle components including door panels, consoles and headliner components.

The instrument panel 12 more particularly includes an upper surface 14 which is located forwardly and below the front windshield 16 of the vehicle. On the passenger side of the upper surface 14 is a passenger side supplemental impact restraint (SIR) door 15 which covers and contains a restraint device or air bag system 17. As illustrated in FIGS. 2 and 3, the air bag system 17 includes an air bag 19 folded in a compartment 21 behind the door 15. The door 15 is placed within an opening 23 of the instrument panel 12 and connected thereto by a hinge or tether 25. Upon deployment of the airbag system 17, the door 15 will open by pivoting along the hinge 25. It is to be understood that the door 15 can take any shape and is schematically represented by the following description.

The upper surface 14 is formed by an outer cover material or skin layer 18 which in one working embodiment is made from a relatively soft polyvinyl chloride resin material (PVC). In the preferred embodiment, the cover material 18 is an expanded vinyl material which includes a composite of at least two layers of material bonded together, such as a thin vinyl (PVC) outer film layer and an interior expanded urethane foam layer adhered to one another at an interface therebetween to form a resultant laminated material.

The outer cover material 18 covers and contains a panel insert member 20 and door insert member 22. The panel insert member 20 is molded to the desired configuration in a standard injection molding operation, as commonly known in the art. The panel insert member 20 includes a rigid form 26 made of plastic or metal. The panel insert member 20 includes an opening 23 therein for placement of the SIR door 15. The door insert member 22 is made of light impact resistant material 28 such as aluminum or other suitable high strength material.

The resultant product of the instrument panel 10 includes the layer of skin or cover material 18 formed over the panel insert member 20 and the door insert member 22. The cover material 18 is adhered to the inserts 20, 22 as commonly known in the art, such as by a spray adhesive 30.

The method of the subject invention produces the passenger side visible SIR door 15 and the full instrument panel 12 in a single cover forming operation. The method applies a single, uniform continuous sheet of the cover material 18 to the panel insert member 20 and the door insert member 22 in a single operation such that the door 15 and instrument panel 12 will be covered by the same material with similar characteristics, such as color and grain. Accordingly, the method avoids possible color shift in methods where the door and instrument panel are covered by an outer material cut different manufacturing stations.

The cover material 18 is generally a PVC material which is of a softness and appearance, and can include a grain therein, i.e. simulated leather. Therefore, the grain of the cover material 18 can be perfectly matched, along with eliminating color shift between the parts as can occur when different pieces of skin are utilized. Lastly, the cover material 18 for the door 15 is made from a section of material over the panel 12 that otherwise would become scrap and waste in forming the opening for the door in the panel 12.

The insert members 20, 22 are washed and dried to prepare for the process. As best illustrated in FIGS. 4a-4d, the method of making the trim panel 10 includes spraying both the preformed panel insert member 20 and the preformed door insert member 22 with an adhesive layer 30 and which are subsequently oven dried. Thereafter, a support mold or member 32 is provided for supporting the panel insert member 20 and door insert member 22 during application of the cover material 18. The support member 32 includes a support surface 34 of a shape complimenting the shape of the panel insert member 20, and a support tower 36 extending vertically from the surface 34 having a support head 38. The panel insert member 20 is loaded onto the support surface 34 such that the support tower 36 extends through and above the opening 23. Thereafter, the door insert member 22 is loaded on the support head 36 of the support tower 38. Vacuum cups 42 connected to the support member 32 are activated to hold the insert members 20, 22 securely in position (FIG. 4a). The support member 32 then rotates into a preheat oven that heats the surface of the inserts 20, 22. Thereafter, the support member 32 is rotated to a forming station.

Figure 4B:
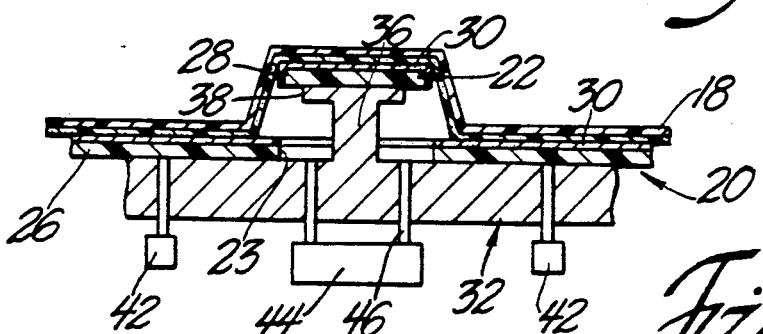
Figure 4C:
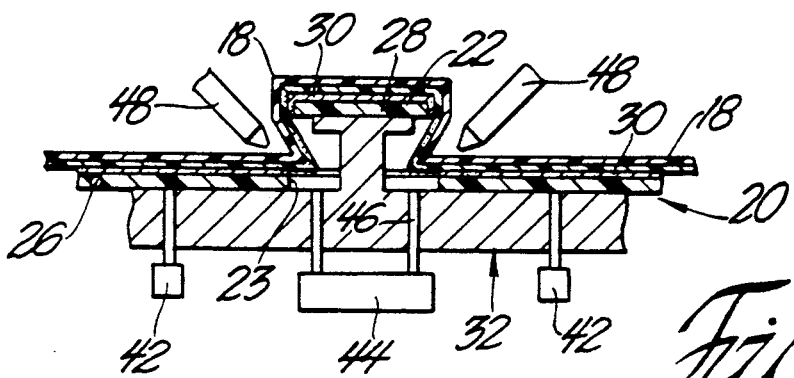

With reference to FIG. 4b, the heated sheet of skin or cover material 18 is placed over the insert members 20, 22 adjacent the adhesive layer 30. A vacuum 44 connected to the support member 32 is activated to cause vacuum forming of the cover material 18 against the inserts 20, 22. The support member 32 includes a plurality of apertures 46 therein, as commonly known in the art, to allow the vacuum suction to occur through the support member 32. Plug assists 48 (FIG. 4c) are utilized to form the skin layer 18 around the door insert member 20 and the opening 23. The plug assists 46 push the cover material 18 into deep draw areas. The molding of a cover material 18 adjacent a substrate is commonly known and general vacuum molding principles are applied herein to perform the similar function. The support member 32 may rotate to a cooling station.

Figure 4D:
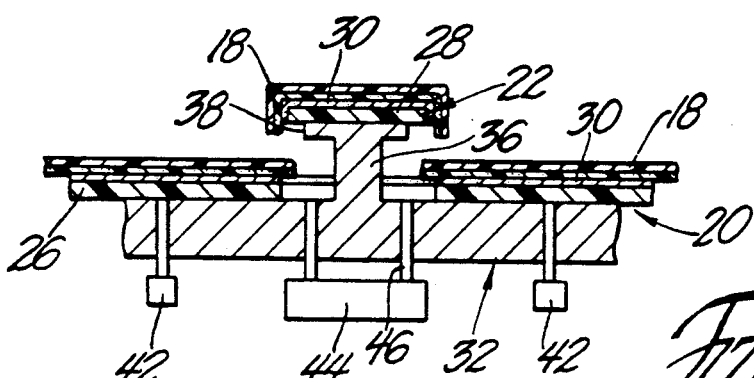

Thereafter, as illustrated in FIG. 4d, the cover material 18 is trimmed or cut between the door insert member 20 and the opening 23 to separate the covered door 15 from the instrument panel 12. The door 15 is removed from the tower 36, and thereafter the instrument panel 12 is removed from the support member 32. The door 15 and panel 12 may thereafter be assembled and placed in the vehicle compartment 10 as commonly known in the art.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A method for forming a cover material over a preformed door insert and a preformed panel insert of an interior trim product for an automobile, the method including the steps of:

applying an adhesive over the panel insert and the door insert;

placing the panel insert having an opening therein on a support member;

extending a support tower of the support member through the opening;

placing the door insert on the support tower aligned with the opening of the panel insert;

placing a continuous unitary cover material over the panel insert and door insert; and forming the cover material continuously over and around the door insert and continuously over the panel insert.

2. A method as set forth in claim 1 further including vacuum forming the cover material about the door insert and to the panel insert.

3. A method as set forth in claim 2 further including using plug assists to form the cover material around the door insert.

4. A method as set forth in claim 1 further including spraying the adhesive on the door and panel inserts prior to placing same on the support.

5. A method as set forth in claim 4 further including heating the adhesive on the door and panel inserts and heating the cover material prior to placement on the door and panel inserts.

6. A method as set forth in claim 1 further including trimming the cover material around the door insert and removing same from the support member.

* * * * *